Dec. 25, 1962   D. D. WOOLSTON ETAL   3,070,773
TELEMETERING TRANSMITTER
Filed April 30, 1957
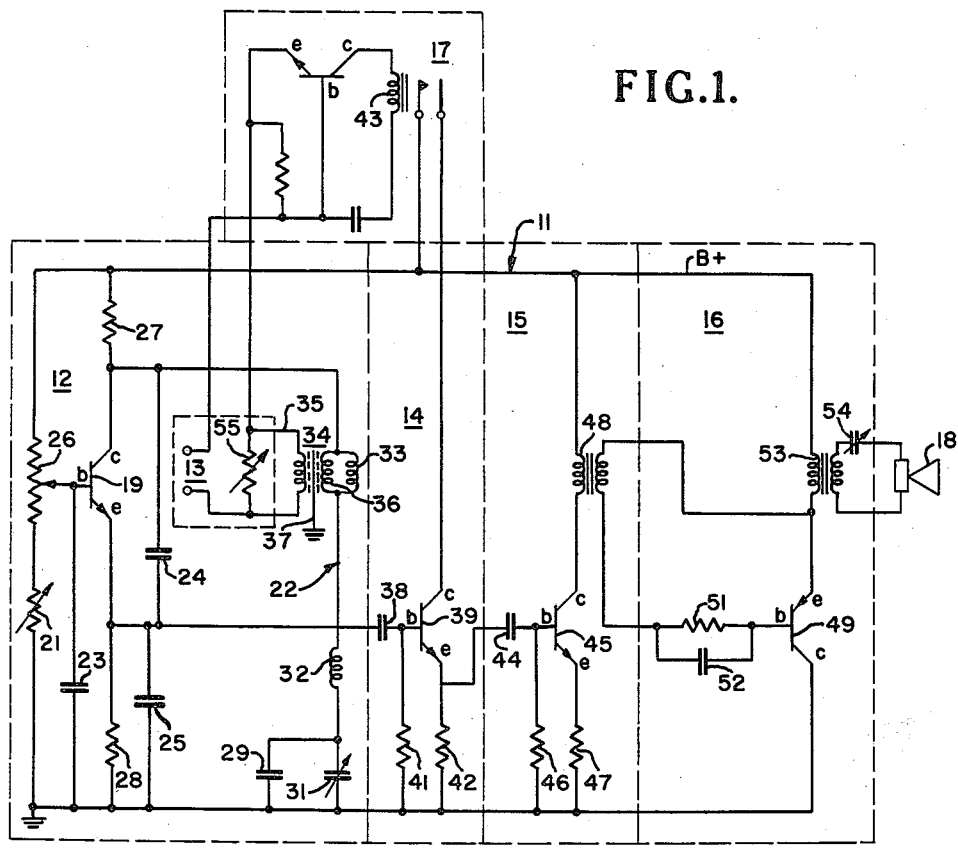
FIG.1.
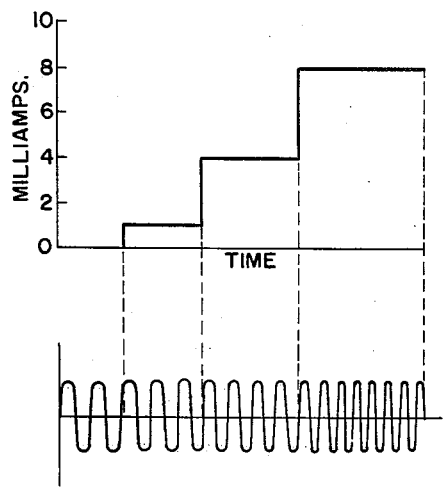
FIG.2a.
FIG.2b.
INVENTORS
D. D. WOOLSTON
M. N. MIRALDI
W. H. MANNING
M. J. AUCREMANNE
BY
ATTYS United States Patent Office 3,070,773
Patented Dec. 25, 1962

3,070,773
TELEMETERING TRANSMITTER
Daniel D. Woolston, Silver Spring, and Mario N. Miraldi, Mount Rainier, Md., Walter H. Manning, Indialantic Beach, Fla., and Marcel J. Aucremanne, Rockville, Md., assignors to the United States of America as represented by the Secretary of the Navy
Filed Apr. 30, 1957, Ser. No. 656,157
6 Claims. (Cl. 340—5)
(Granted under Title 35, U.S. Code (1952), sec. 266)

The invention described herein may be manufactured and used by or for the Government of the United States of America for governmental purposes without the payment of any royalties thereon or therefor.

This invention relates generally to frequency modulation systems and more particularly to a transistorized frequency modulated transmitter circuit.

In many technical fields, it is desirable to monitor the operational characteristics of a device by transmitting electrical signals indicative of a phenomenon occurring within the device to a remote receiving or monitoring station. Although the transmission of the electrical signals may be effected by physical means such for example as an electrical cable interconnecting the device and the station, in some applications, such for example as in underwater devices, such a physical connection is impractical or undesirable and acoustic signal telemetering transmission must be employed.

In monitoring applications requiring acoustic telemetering transmission, it is imperative that the operation of the monitored device be not adversely influenced by the physical presence of the telemetering transmitter. In order to satisfy this essential requirement, the telemetering transmitter should exhibit design characteristics of compactness of size, simplicity of design, self-containment, minimum of heat dissipation and minor magnetic properties.

The incorporation of the hereinabove enumerated desirable design characteristics has not been readily obtained in a majority of the heretofore devised and utilized telemetering transmitters.

Accordingly, a principal object of the present invention is to provide a new and improved miniaturized acoustics wave telemetering transmitter circuit.

Another object of the present invention is to provide a new and improved telemetering transmitter circuit particularly suitable in underwater telemetering transmission applications.

Still another object of the present invention is to provide a new and improved frequency modulated telemetering transmitter.

A further object of the present invention is to provide a new and improved transistorized frequency modulated telemetering transmitter.

A still further object of the present invention is to provide a simple, compact, self-contained, long life, shock resistant and stable telemetering transmitter circuit.

Another still further object of the present invention is to provide a new and improved telemetering transmitter circuit having a minimum of magnetic material componential elements.

Other objects and many of the attendant advantages of this invention will be readily appreciated as the same becomes better understood by reference to the following detailed description when considered in connection with the accompanying drawing wherein:

FIG. 1 is a diagrammatic circuit of the telemetering transmitter according to the present invention; and FIGS. 2a and 2b illustrate the waveforms of the input signal to and the corresponding output signal from the circuit shown in FIG. 1.

Referring now to the drawing and more particularly to FIG. 1 whereon the novel telemetering transmitter according to the present invention is indicated generally by the reference numeral 11. As shown thereon, the transmitter 11 comprises an oscillator 12, input circuit 13, buffer amplifier circuit 14, voltage amplifier 15, power amplifier 16, relay amplifier circuit 17 and a transmitting transducer 18.

The oscillator circuit 12 is basically a transistorized arrangement of a conventional Clapp oscillator, and consists of a junction type transistor 19 of the n-p-n type configuration, a thermistor 21 for effecting ambient temperature compensation, and an oscillator frequency control network, generally indicated by reference numeral 22. Also included in the oscillator circuit is by-pass capacitor 23, frequency stabilizing capacitors 24 and 25, respectively connected across the collector-emitter and emitter-base electrodes of transistor 19 and a gain control potentiometer 26. Potentiometer 26 is connected across the energizing potential source B+ and by varying the base bias potential of transistor 19 provides an effective control of the amplitude of the oscillatory signal generated by oscillator 12. Resistors 27 and 28 are included in the collector and emitter circuits, respectively of transistor 19 for providing suitable operating potentials thereto.

The frequency control network 22 is a series resonant circuit connected across the collector-emitter electrodes of transistor 19, and includes parallel connected fixed capacitor 29 and trimmer capacitor 31, fixed inductances 32 and 33, and a saturable reactor 34 equivalent to the type commercially available under the trade name "Increductor." The parallel connected capacitors 29 and 31 operate to establish or vary within limitations the basic oscillator frequency of oscillator circuit 12, while the saturable reactor 34 operates to frequency modulate the oscillator 12 by varying the resonant frequency of the series resonant circuit 22 at a rate correlative to the intelligence signal applied to input circuit 13 as will be described more fully hereinafter. Saturable reactor 34 consists of a control winding 35 and a signal winding 36, said windings being serially connected in input circuit 13 and series resonant circuit 22, respectively. The core of the saturable reactor is grounded by means of conductor 37.

The frequency signal developed by oscillator circuit 12 is coupled through capacitor 38 to the buffer amplifier stage 14 which consists of a junction transistor 39 of the n-p-n type, and being operated in the well known common collector amplifier configuration. Also included in the buffer amplifier 14 are resistors 41 and 42 for establishing suitable biasing potentials for operation of transistor 39. The buffer amplifier 14 operates as an On-Off switch by being normally maintained in a deenergized condition thereby minimizing the standby power requirements of transmitter 11. Upon the application of a control signal to input circuit 13, a conventional transistorized relay amplifier 17, connected in the conventional common base configuration, will operate relay 43 to a closed position whereupon buffer amplifier 14 will be connected to the potential energy source B+ and energized.

The output frequency signal of buffer amplifier 14 is transmitted through coupling capacitor 44 to a voltage amplifier 15 consisting of an n-p-n junction transistor 45, connected in the well known common emitter configuration, and including resistors 46 and 47 of predetermined magnitudes for establishing suitable operating bias potentials for transistor 45.

The amplified output signal of voltage amplifier 15 is coupled through interstage transformer 48 to the power amplifier circuit 16 wherein the necessary energy for driving transducer 18 is developed. Amplifier circuit 16 includes an n-p-n junction power transistor 49 having resistor 51 and by-pass capacitor 52 parallel connected in the base circuit thereof for establishing suitable operating potential levels for transistor 49, and output transformer 53. Transistor power amplifier 16 is connected in the common collector amplifier configuration thereby to provide suitable impedance transformation between transducer 18 and the preceding circuit stages of transmitter 11. A variable capacitor 54 is included for peaking the frequency response of the transducer. In applications requiring the use of non-magnetic materials, a crystal transducer, such for example, as a barium titanate transducer is prefearably utilized.

Considering now the operation of the hereinabove described transmitter 11, the carrier frequency of the transmitter is established at a preselected frequency, preferably the transducer 18 resonant frequency, by means of capacitors 29 and 31 arranged in the series resonant circuit 22 of the oscillator 12. However, inasmuch as relay 43 normally interrupts the energizing circuit to buffer amplifier 14, no signal is impressed upon transducer 18 at this time for transmission to a remote monitoring station, not shown in the drawing. Upon the application of an intelligence signal indicative of an operational characteristic of the monitored device, such for example as the staircase waveform shown in FIG. 2a, to input circuit 13, relay amplifier 17 actuates relay 43 thereby energizing buffer amplifier 14 whereupon transmission of the carrier frequency signal of oscillator 12 to the monitoring station is effected. Additionally, since the control winding 35 is serially connected in the input circuit, the unidirectional intelligence signal will flow through the control winding 35 thereby varying the magnetic coupling conditions in saturable reactor 34 in such manner as to vary the inductance of signal winding 36 at a rate proportional to the instantaneous magnitude of the applied signal. Inasmuch as the signal winding 36 is serially connected in the frequency control network 22 of the oscillator 12, the oscillator carrier frequency is frequency modulated at a rate correlative to the intelligence signal applied to input circuit 13, as illustrated by the waveform of FIG. 2b. As a precaution against too large a frequency shift in the oscillator frequency, a varistor 55 is included in the input circuit in parallel with the control winding 35 for shunting a substantial proportion of the applied intelligence signal around the control winding. In response to the termination of the intelligence signal to input circuit 13, relay 43 again deenergizes buffer amplifier 14 thereby terminating acoustic signal transmission from transmitter 11 to the monitoring station.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. A telemetering transmitter comprising a unidirectional potential source, a transistor oscillatory circuit coupled to said source, a thermistor included in said circuit for providing ambient temperature compensation therefor, a frequency determinative resonant network included in said circuit for establishing the unmodulated frequency of the carrier signal generated by said oscillatory circuit, an input circuit for receiving an electrical intelligence signal, saturable reactance means intercoupling said input circuit and said resonant network for frequency modulating said generated carrier signal at a rate correlative to the magnitude of said intelligence signal, a varistor included in said input circuit for limiting the magnitude of frequency modulation, a normally deenergized transistor buffer amplifier stage coupled to said oscillatory circuit for translating the frequency modulated carrier signal upon being rendered energized, a normally interrupted transistor relay amplifier circuit intercoupling said buffer amplifier stage and said source, said relay amplifier circuit being rendered energized upon receipt of an intelligence signal by said input circuit thereby rendering said buffer amplifier stage energized, a transistor voltage amplifier stage coupled to said buffer amplifier stage and to said source for amplifying the translated frequency modulated carrier signal, an output stage including a transducer for transmitting the amplified frequency modulated carrier signal, and a transistor power amplifier stage connected to said source and intercoupling said output stage and said voltage amplifier stage for providing a suitable impedance transformation therebetween.

2. A telemetering transmitter according to claim 1 and including means in said output stage for peaking the frequency response of said transducer.

3. A telemetering transmitter comprising a unidirectional potential source, a transistor oscillatory circuit coupled to said source and including a frequency determinative resonant network for establishing the unmodulated frequency of a carrier signal, means in said circuit for providing ambient temperature compensation therefor, an input circuit for receiving an electrical intelligence signal, saturable reactance means intercoupling said input circuit and said resonant network for frequency modulating the generated carrier signal at a rate correlative to the magnitude of the intelligence signal, varistor means in said input circuit for limiting the magnitude of the frequency modulation of the intelligent signal, a normally de-energized transistor amplifier means coupled to said oscillatory circuit for translating the frequency modulated carrier signal upon being rendered energized, a normally interrupted transistor relay means intercoupling said amplifier means and said source, said relay means being rendered energized upon receipt of an intelligence signal by said input circuit thereby rendering said amplifier means energized, a transducer electrically connected to said amplifier means for effecting transmission of the amplified frequency modulated carrier signal to a remote receiving station.

4. A telemetering transmitter comprising a unidirectional potential source, a transistor signal generating means including a frequency determinative resonant network for establishing the unmodulated frequency of a carrier signal, means in said generating means for providing ambient temperature compensation therefor, input means intercoupled to the resonant network for receiving an electrical intelligence signal and modulating the carrier signal at a rate correlative to the magnitude of said intelligence signal, a varistor in said input means for limiting the magnitude of the frequency modulation by the intelligent signal, a normally de-energized amplifier means coupled to said generating means for amplifying the modulated carrier signal upon beng energized, a normally interrupted relay means intercoupling said amplifier means and said source, said relay means being rendered energized upon receipt of an intelligence signal by said input means thereby rendering said amplifier means energized, an output stage connected to said amplifier means and including a crystal transducer for transmitting the amplified frequency modulated carrier signal to a remote receiving station.

5. A telemetering transmitter according to claim 4 wherein said amplifier means includes a normally de-energized transistor buffer amplifier stage coupled to said generating means through said relay means for translating the frequency modulated carrer signal upon being energized, said relay means intercoupling said buffer amplifier to said source when energized, a transistor voltage amplifier coupled to said buffer amplifier and to said source for amplifying the translated frequency modulated carrier signal, a transistor power amplifier stage connected to said source and intercoupling said output stage and said voltage amplifier stage for providing amplification for said modulated carrier signal.

6. A telemetering transmitter circuit comprising means for generating an electric signal of a preselected frequency, means including in said signal generating means for providing ambient temperature compensation therefor, input means for receiving an electrical intelligence signal, reactance means intercoupling said input means and said generating means for modulating the electric signal at a rate correlative to the magnitude of the intelligence signal, a normally deenergized amplifier stage coupled to said reactance means, relay means for energizing said amplifier stage upon receipt of the intelligence signal by said input means, and output means including a transducer connected to said amplifier for transmitting an acoustic signal correlative to the modulated electric signal to a remote receiving station.

References Cited in the file of this patent

UNITED STATES PATENTS

| | | |
|---|---|---|
| 2,287,862 | Brian | June 30, 1942 |
| 2,431,018 | Bailey et al. | Nov. 18, 1947 |
| 2,448,713 | Hansell | Sept. 7, 1948 |
| 2,448,787 | Ferrel | Sept. 7, 1948 |
| 2,499,806 | Wouk et al. | Mar. 7, 1950 |
| 2,547,876 | Krasnow | Apr. 3, 1951 |
| 2,567,896 | Semm | Sept. 11, 1951 |
| 2,708,219 | Carver | May 10, 1955 |
| 2,751,577 | Du Bois | June 19, 1956 |
| 2,771,584 | Thomas | Nov. 20, 1956 |
| 2,783,380 | Bonn | Feb. 26, 1957 |
| 2,801,374 | Svala | July 30, 1957 |
| 2,844,712 | Noizeux | July 22, 1958 |

FOREIGN PATENTS

| | | |
|---|---|---|
| 596,439 | Germany | May 3, 1934 |

OTHER REFERENCES

Electronics, August 1949, pp. 90–91.

Electronics, "Transistor Circuitry in Japan," pp. 120–124, vol. 29, No. 7, July 13, 1956.